United States Patent [19]

Bohn et al.

[11] 4,019,411
[45] Apr. 26, 1977

[54] BAR FEED CONTROL ARRANGEMENT FOR BAR LOADING MAGAZINES

[75] Inventors: Burkhard W. Bohn; Alfred Evers; Karl-Heinz Friederichs, all of Kiel, Germany

[73] Assignee: Hagenuk Vormals Neufeldt & Kunke GmbH, Kiel, Germany

[22] Filed: Aug. 13, 1975

[21] Appl. No.: 607,112

[30] Foreign Application Priority Data

Aug. 14, 1974 Germany ........................ 2438934

[52] U.S. Cl. .................................. 82/2.7; 214/1.1
[51] Int. Cl.² ...................................... B23B 15/00
[58] Field of Search ............... 82/2.5, 2.7; 214/1.1, 214/1.2

[56] References Cited
UNITED STATES PATENTS

| | | | |
|---|---|---|---|
| 3,131,587 | 5/1964 | Spohn et al. | 82/2.7 |
| 3,419,160 | 12/1968 | Azuma | 82/2.7 X |
| 3,691,879 | 8/1972 | Blake | 82/2.5 |

*Primary Examiner*—Leonidas Vlachos
*Attorney, Agent, or Firm*—Michael J. Striker

[57] ABSTRACT

A bar loading machine for the automatic feeding of bars to an automatic screw machine or other bar machine includes a bar-engaging device, a feed chain for driving the bar-engaging device, a start switch arrangement for sensing the arrival of the leading end of a bar, and a feed control arrangement. The feed control arrangement establishes the feed distance required for properly positioning the leading end of the bar in the bar machine, and includes first and second distance-measuring arrangements which successively and independently of each other control the movement of the feed chain. The first distance-measuring device includes a fixed stop arrangement for limiting the feeding of a bar.

8 Claims, 6 Drawing Figures

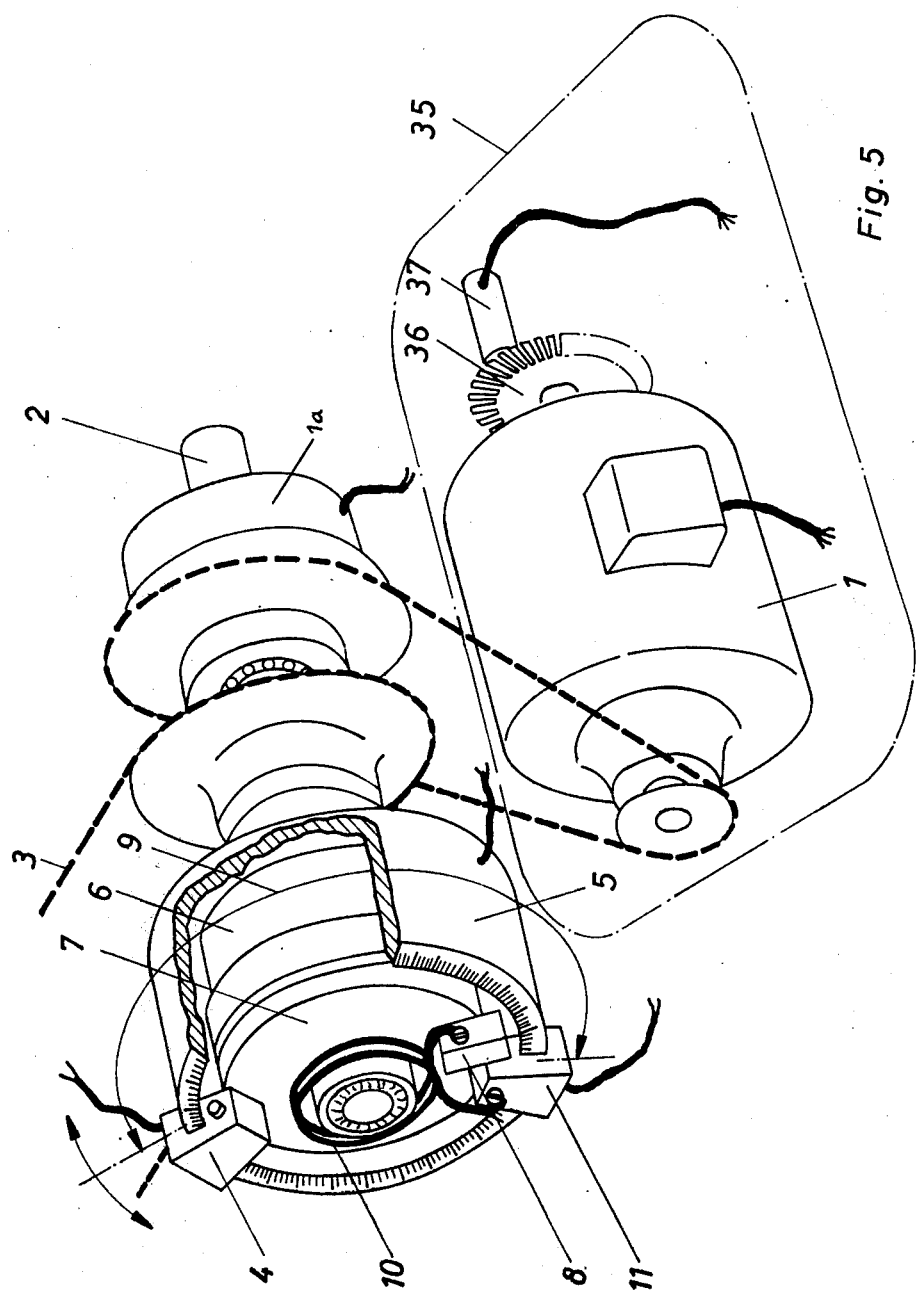

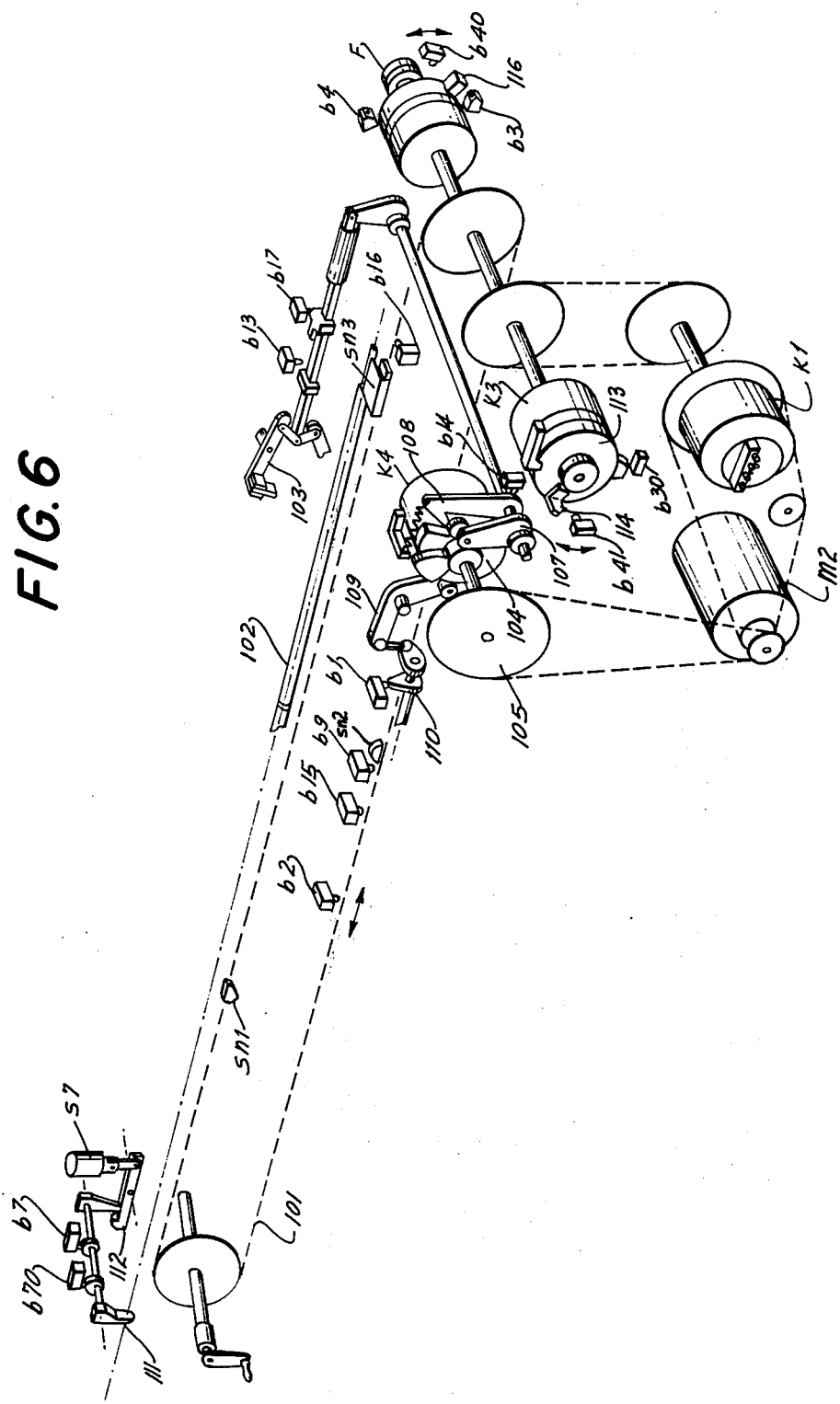

BAR FEED CONTROL ARRANGEMENT FOR BAR LOADING MAGAZINES

BACKGROUND OF THE INVENTION

The invention relates to an arrangement for controlling the feeding of bars in bar loading magazines for automatically feeding bar material to machine tools.

Federal Republic of Germany patent DT-PS No. 1,777,170, and corresponding U.S. Pat. No. 3,131,587, teach the positioning of a bar by means of a control chain. The control chain, upon engagement of a start switch located in the path of the bar feed, by means of a controllable coupling is frictionally engaged and is stopped after the traversing of a measured distance corresponding to the spacing between the start switch and the cut-off tool of an automatic screw machine, when a cam on the control chain engages a stationary stop. The feed chain, frictionally engaged with the control chain, is then likewise arrested, and in that way effects the positioning of a new bar for feeding.

The aforedescribed arrangement, in which the distance-measuring means senses the proper positioning of the bar in terms of the engagement of fixed stops by moving cams, is not suitable for some applications, for example continual feed of a length of bar corresponding to the workpiece length without a fixed stop in the machine tool. Furthermore, in the aforedescribed arrangement, bar retractions subsequent to each workpiece feed, which might be necessary when the bar loading magazine is working together with a turntable indexing machine to give free space for rotational movement of the clamping arrangement on the turntable, are impossible to perform.

SUMMARY OF THE INVENTION

It is an object of the invention to avoid both the limited applicability of the known arrangement as well as its design disadvantages, and to provide a feed control arrangement which makes possible both the correct severing of the unusable leading end of the bar and also makes it possible to properly position the bar for each individual workpiece feed or possibly for bar retractions performed subsequent to each workpiece feed.

These objects, and others which will become more understandable from the description, below, of preferred embodiments, can be met according to one advantageous concept of the invention in that the measurement distance for positioning the leading end of the bar in the machine tool is determined by two distance-measuring arrangements which operate independently of each other one after the other, including a first distance-measuring arrangement and a second distance-measuring arrangement, of which the first is provided with a fixed stop member for limiting the feed distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 depicts a modification of the second distance-measuring arrangement of FIG. 4, comprised of a pulse-generating disk mounted on the motor shaft and cooperating with a stationary contactless pulse generator; and FIG. 6 depicts the distance-measuring arrangements of FIG. 3 in the context of the bar loading magazine of a machine tool set-up.

DESCRIPTION OF THE PREFERRED EMBODIMENTS

Figure 1:
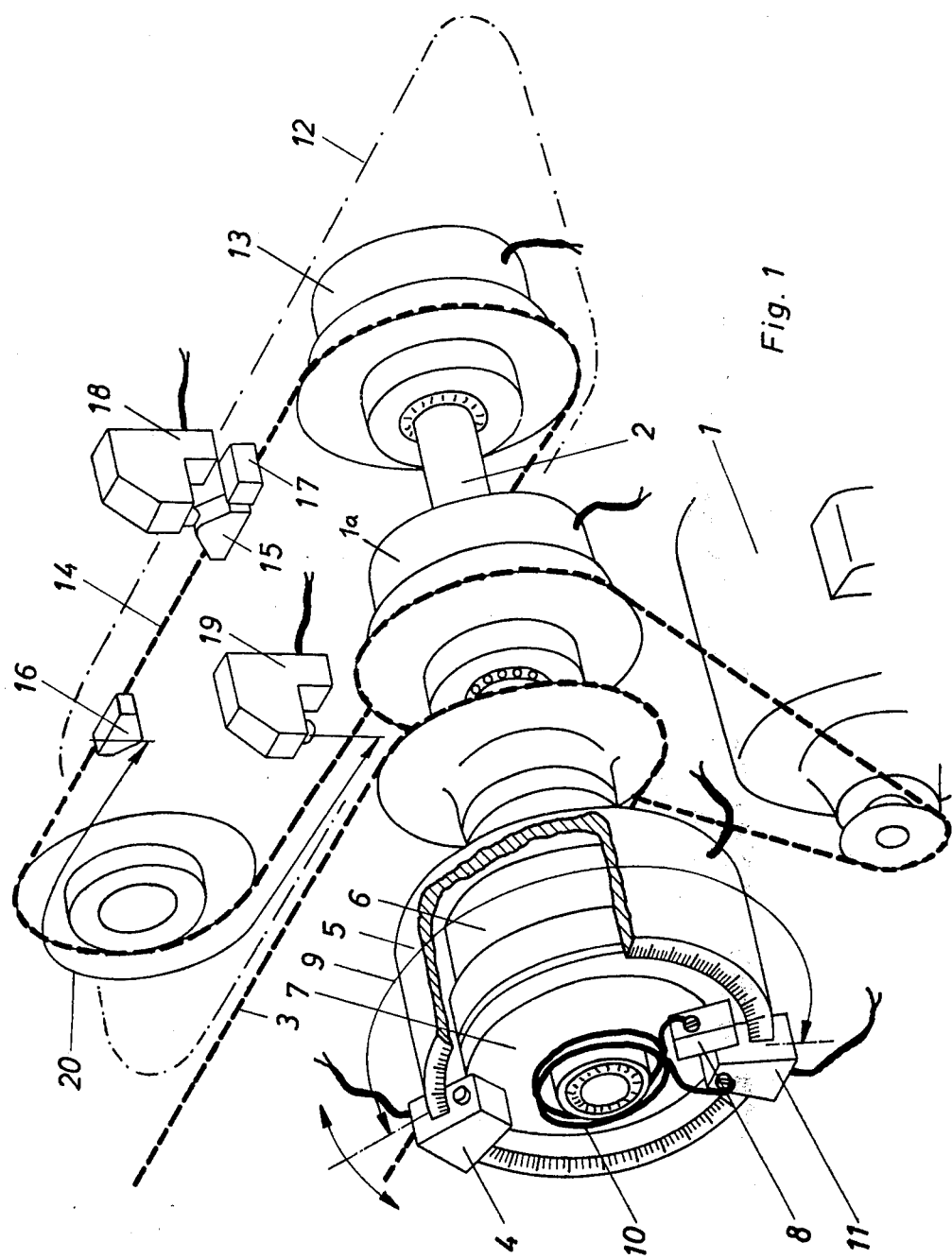
FIG. 1 depicts a first embodiment of the inventive feed control arrangement including a first distance-measuring arrangement comprised of switch-activating cams and fixed stops and a second using a measuring chain.

The embodiment depicted in FIG. 1 cooperates with a known type of bar loading magazine having a drive motor 1 which drives a feed shaft 2 which is in continual engagement with the feed chain 3, to which is connected a first distance measuring arrangement 5 provided with an adjustable stop member 4.

To end a feed, a clutch 6 is engaged to frictionally join the cam shaft 7 with the feed shaft 2, the rotary motion of which is limited when cam 8 engages the adjustable stop member 4 after the traversing of the infeed distance 9. If there is no fixed abutment in the machine tool, the infeed distance 9 can be set to correspond to the length of one workpiece. By means of a return spring 10, the distance measuring arrangement 5 is automatically returned to its starting position, determined by a stop member 11, when the clutch 6 is deactivated. The distance measuring arrangement 5 can be rendered operative by a command signal which is generated together with the turn-on command signal for the bar feed, with the distance measuring arrangement being activated in the time shortly before until shortly after the opening of the gripping means of the machine tool.

The first distance-measuring arrangement 5 can be controlled by a second distance measuring arrangement 12, comprised of components 13–19. For the feeding of a new bar, the measuring chain 14 is frictionally connected with the feed chain 3 by means of the clutch 13 and the feed shaft 2, in dependence upon the operation of the start switch arrangement built into the loading magazine. Provided on the measuring chain 14 are switch-activating cams 15 and 16 which, starting from the rear end position, in which the cam 15 lies against the fixed stop 17 and activates the control switch 18, activates a control switch 19 after elapse of the required infeed distance 20. Activation of control switch 19 activates the first distance-measuring arrangement 5, whose measuring distance 9 has been set for the workpiece length, when the non-illustrated program control circuit for the machine advances to the next program step, and simultaneously the clutch 13 is deactivated until the feed chain 3 performs the return movement. In this way, the first distance-measuring arrangement 5 can be utilized not only for the workpiece-length feed but also for the feeding of a new bar.

Figure 2:
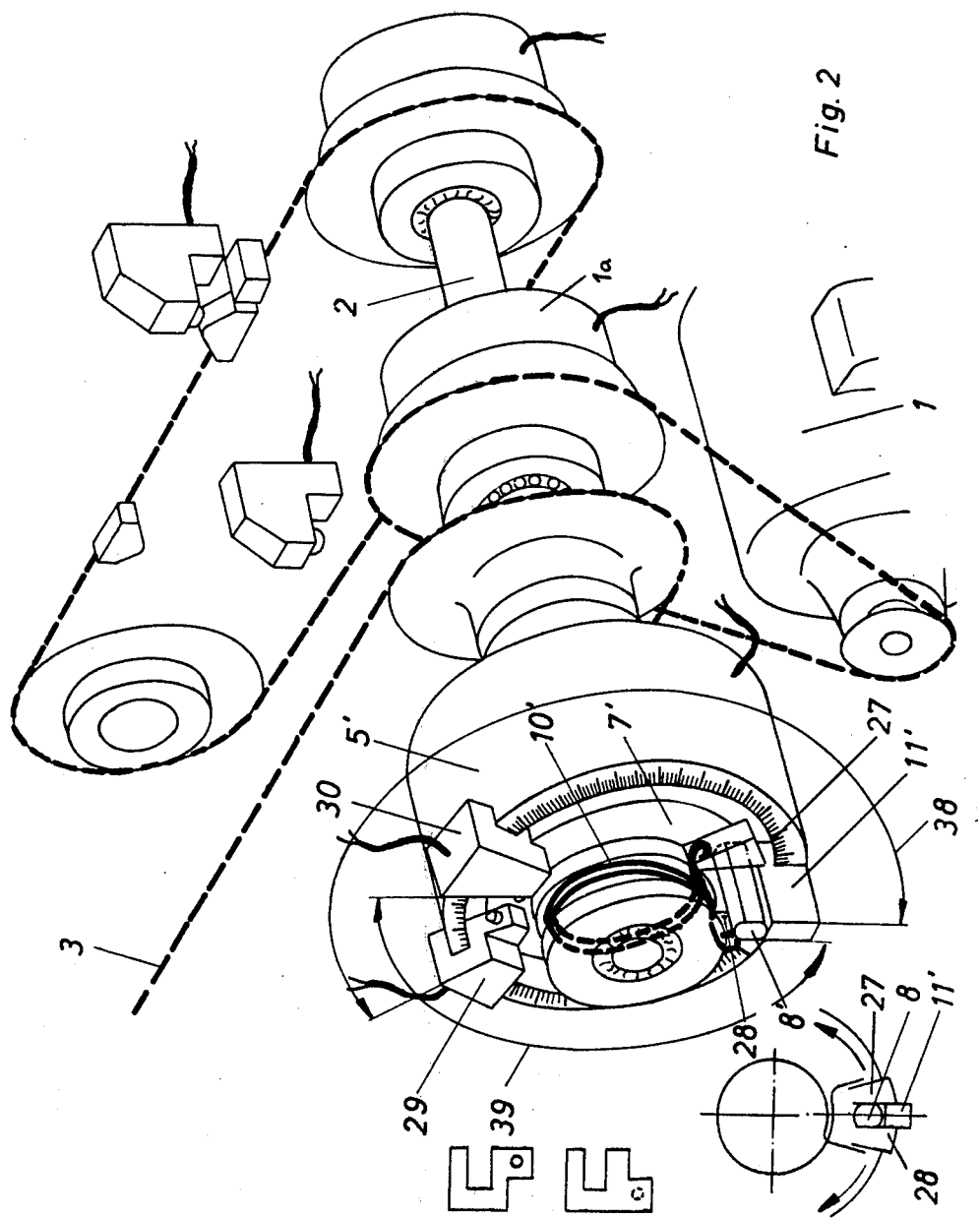
FIG. 2 depicts another version of the first distance-measuring arrangement of FIG. 1, by means of which both the bar feed is limited and a well-defined bar retraction is made possible.

In the embodiment of FIG. 2, the first distance-measuring arrangement 5 can be used not only for controlling the bar infeed, but also if necessary controlling the return movement by definite distances after each bar infeed. To this end, the first distance-measuring arrangement 5' is provided with a return spring 10' designed as a prestressed torsion spring operative in the rest position for maintaining the cam shaft 7' with its cams 8' by spring force by means of the cams 27 and 28 fixed against the fixed stop 11'.

The cam shaft 7' can be turned out of this rest position in both rotary directions against the spring force. In the forwards direction the cam disk travels with cam 27, whereas in the rearwards direction the cam disk travels with cam 28. When turning in the feed direction, the cam disk with cam 27 runs against fixed stop 29; when turning in the direction opposite to the feed direction, the cam disk with cam 28 runs against the return-movement distance stop 30. Both stops are adjustable independently of each other, and each has associated with it a control switch for generating a control signal when it is contacted by one of the cams.

Figure 3:
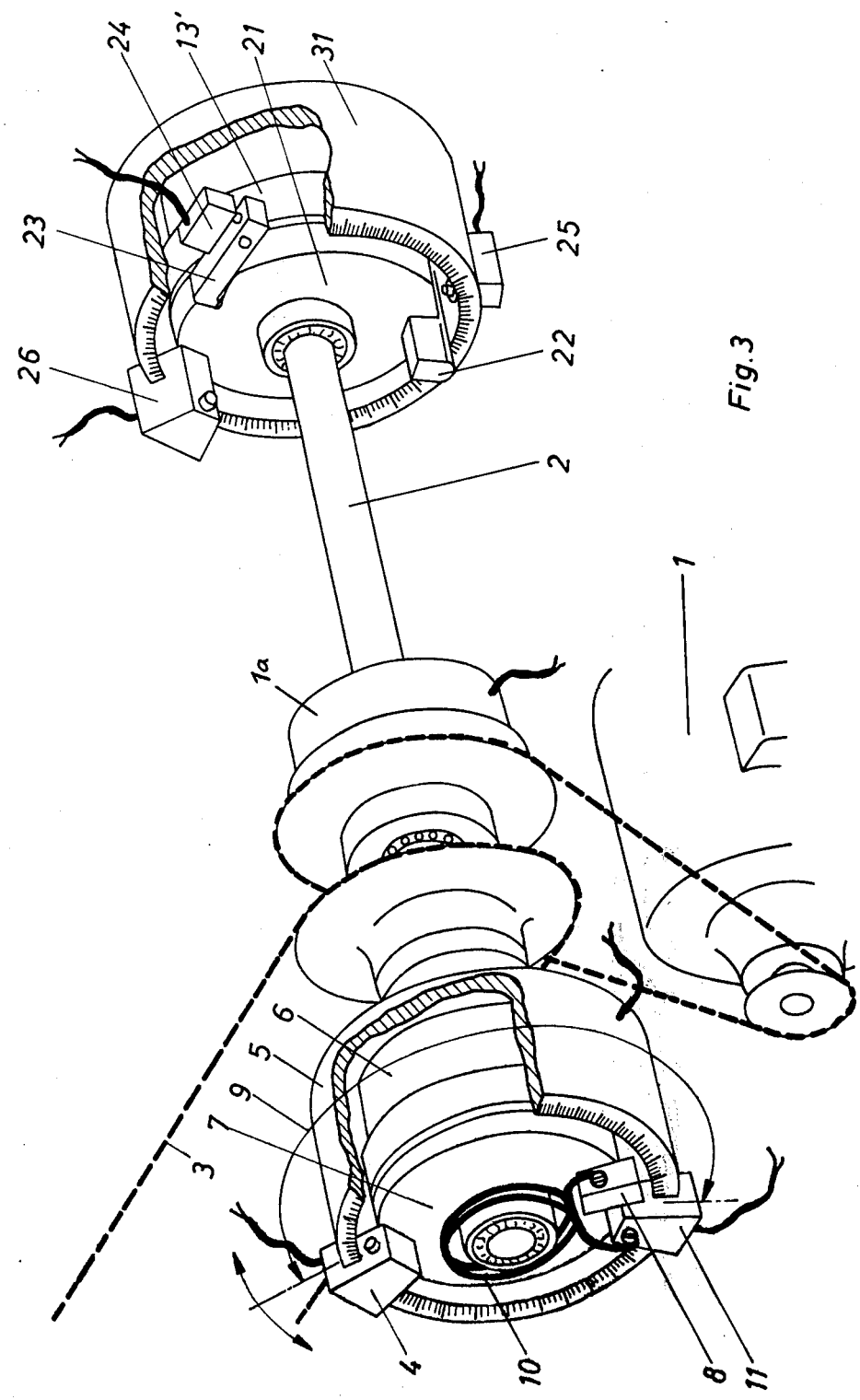
FIG. 3 depicts another version of the second distance-measuring arrangement, by means of which a cam connected with the feed shaft via a clutch moves past a counter to effect counting of the rotations of the shaft, with the pulse count from the counter controlling a program control circuit.

Another embodiment of the first distance-measuring arrangement 5 is illustrated in FIG. 3 in connection with a second distance-measuring arrangement 31. Instead of a measuring chain 14 with cams 15 and 16, there is provided a cam disk 21 connected with the clutch 13' and provided with a switching cam 22. When the cam disk 21 and switch-activating cam 22 move out of their null position, in which the latch 23 engages a recess in the cam disk 21, as a result of which the control switch 24 is activated, and move past a counter switch 25 operative for registering a full revolution of the feed shaft 2, and by means of the generation of an impulse, the program switching circuit present in the loading magazine is advanced by one step.

A further adjustable switch 28, after the elapse of the number of rotations for which the program switching circuit is set, and in dependence upon the required infeed distance, generates a control pulse for activating the first distance-measuring arrangement 5, which then limits the infeed distance in the manner already described. The returning of the cam disk 21 to its null position is performed during the return movement of the feed chain 3 by engaging clutch 13' at this time.

Figure 4:
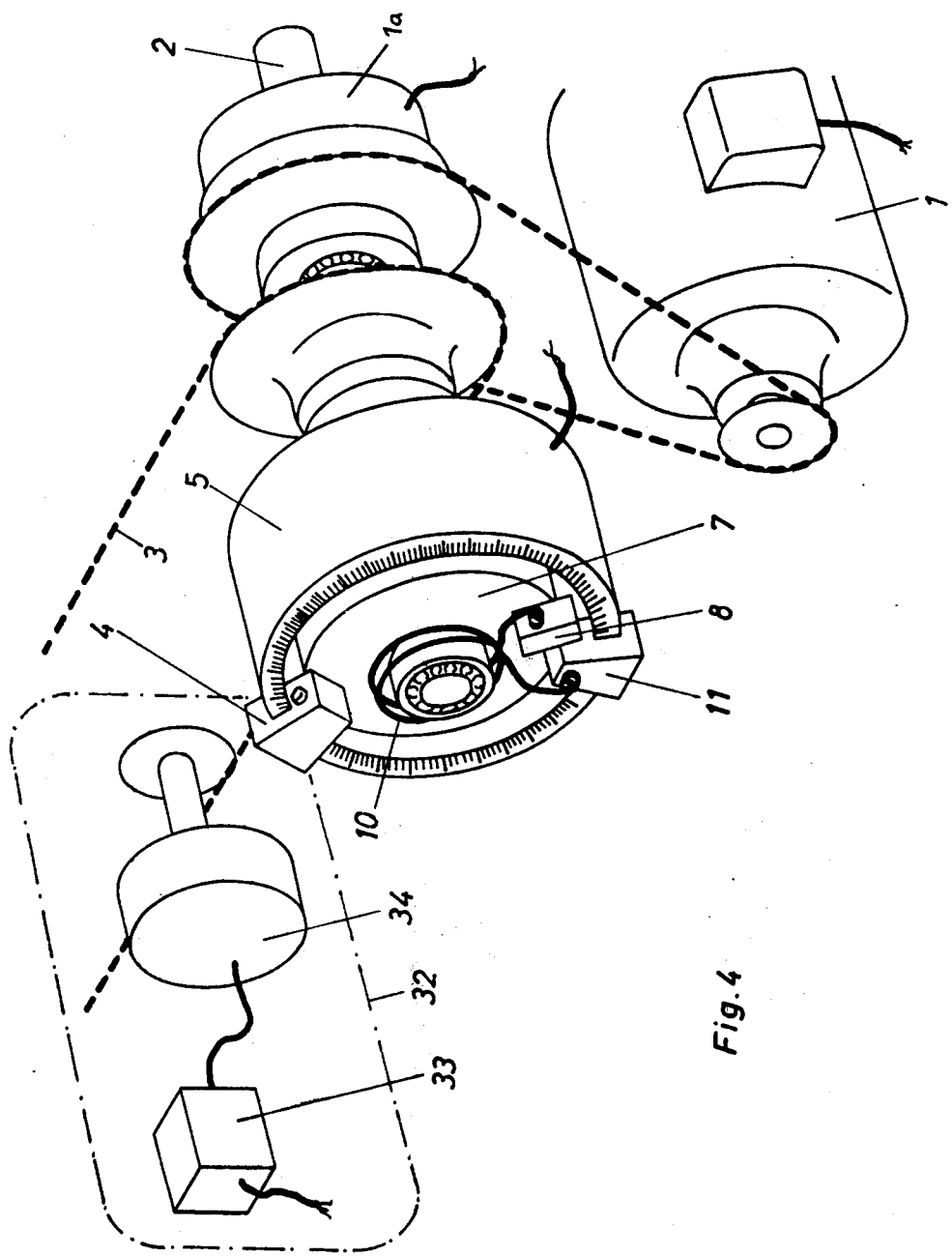
FIG. 4 depicts the first distance-measuring arrangement in conjunction with a second distance-measuring arrangement making use of a pulse counter which is set to a pulse count corresponding to the desired feed distance.

By means of a control arrangement both the forwards movement and rearwards movement is effected by means of a direction reversal of the drive motor, or else by alternately establishing engagement with a forwards motor and with a reverse motor. Advantageously, the distance-measuring arrangements 5, 5', 31 are provided with scale divisions which make possible direct setting of the workpiece length and also the return movement length. The activation of the first distance-measuring arrangement 5, 5' can, as illustrated in FIG. 4, be effected by a second distance-measuring arrangement 32, with a pulse counter 33 being activated by a start switch in the loading magazine, the pulse counter being set for a number of pulses corresponding to the desired feed distance. The generation of the pulses is performed with sufficient resolution by a signal generator 34 coupled with the feed chain 3.

FIG. 5 shows another version 35 of the second distance-measuring arrangement 32 of FIG. 4, in which there is provided on the motor shaft of the drive motor 1 a pulse-generating disk cooperating with a stationary contactless pulse generating device, e.g., a photoelectric arrangement or the like.

FIG. 6 depicts a feed control arrangement essentially identical to that of FIG. 3, in the context of the loading magazine of a machine tool. The analogy between the operation of the embodiment of FIG. 3 and the operation of the other embodiments is self-explanatory.

The operation of the arrangement depicted in FIG. 6 is as follows:

The first step of the machine program is the return movement of the pusher 102.

The return movement is performed at the maximum speed of drive motor $m2$ via the engaged drive clutch $k1$, for example at 600 mm per second.

Shortly before the pusher 102 reaches its end position, the control cam $sn2$ on the feed chain 101 activates the speed switch $b9$ which switches the drive motor $m2$ to its lowest speed (e.g., 150 mm per second). With the thusly lowered speed, the cam $sn3$ on the pusher 102 activates the turn-on switch $b16$ associated with clutch $k4$.

This engages the control clutch $k4$, which effects frictional engagement between the cam disk 104 and the cam shaft 105, which latter rotates continuously with the drive motor $m2$. The cam 106 which rotates with the cam disk 104 causes the roller lever 107 and latch 108 to swing out of their rest position; the latch 108 activates the self-locking switch $b14$ for the control clutch $k4$, and the roller lever 107 causes the gripper 103 to close.

If a bar remnant is present, it is removed by the gripper 103 from the clamping jacket of the pusher 102. If the remnant is not gripped, the monitoring switch $b13$, as a result of the excessive stroke length, switches the magazine off, a malfunction having occurred.

The pusher 102 moves further into its end position. The control cam $sn2$ on the feed chain 103 activates the end position switch $b15$. This causes the driving clutch $k1$ to become disengaged, thereby terminating the return movement of the feed chain 103.

The cam 106 which continues to turn causes the roller lever 107 to swing back into its starting position, and the gripper 103 opens.

Next, the cut-out section of the still turning cam disk 104 is detected by the roller at the end of fork lever 109, which causes the separator shaft 110 to turn. By means of the separator shaft 110, the feed tube is opened, the bar present in the supply bin falls in, the supplied bar slides against the stops, and the "feed off" start switch $b7$ with its finger 111 is guided back into the starting position.

The "forward movement of $m2$ after bar loading" reversal switch $b1$, activated when the feed tube is at maximum loading opening, switches the drive motor $m2$ (after a preselected time delay) to forward movement at lowest speed; accordingly, the direction of rotation of the still engaged cam disk 104 changes.

As a result of the pressing back of the fork lever 109, the separator shaft 110 turns into its starting position, the feeding tube closes and locks, and the bar lying against the stops is separated off in the magazine by means of a plunger.

The cam 106 of the cam disk 104 has now again reached the roller lever 107 and, by effecting the swinging out of the roller lever 107, causes the gripper 103 to close again, grip the bar which has fallen in and activates the turn-on switch b17 associated with clutch k1. As a result, the driving clutch k1 is engaged and causes the pusher 102 to move forwards, and the clamping jacket is pressed onto the bar held by the gripper 103. In the event that the gripper 103 did not grip any bar material, the monitoring switch b13 will have become activated to indicate a malfunction.

The cam 106 continues to turn until it reaches its starting position determined by the latch 108, whereupon the gripper 103 opens again, releasing the feed. As a result of the release of the self-locking switch b14, the control clutch k4 is disengaged.

The leading end of the new bar during the course of the feed movement engages against the swung-in finger 111 of the start switch arrangement. As a result, the "feed off" start switch b7 is activated and, in consequence of the blocking action initiated by the finger 111, the forwards feed is interrupted.

By means of the switch b7 the driving clutch k1 is disengaged, and by engaging the counter clutch k3 the counter disk 113 is connected with the feeding system. A time-delay relay, likewise activated by switch b7, causes the unlatching solenoid s7 to become energized after a short time interval. The latch 112 releases the finger 111, and the finger 111 quickly is pulled out by a tension spring away from the guide tube. This causes "feed on" start switch b70 to become activated. Activation of start switch b70 causes the driving clutch k1 to become engaged again, causing the feeding to resume. As a result, the counter disk 113 is turned out of its starting position (monitoring switch b30). The feeding of the new bar begins.

Depending upon the number of program steps or rotations of the counter disk 113 required for the feeding of the new bar, there is performed, by means of the counter cam 114 of the counter disk 113 and the infeed counter switch, a forwards switching by one step of the program switching mechanism. By means of the last counting step, the counter switch is so preprogrammed that it, upon the next activation, engages the blocking clutch k2 by means of the counter cam 114; as a result, the blocking disk 115 is connected with the feed system.

The blocking disk 115, which has turned out of its null position (monitoring switch b3), limits the infeed of the new bar by the impacting of its block 116 against the "position first parting-off" blocking switch b4. The cutting-off position is reached, and the machine tool is activated. The clutches k1, k2 and k3 are disengaged after the start-up of the machine tool, whereupon the blocking disk 115 is brought back by the return spring F into its null position.

The feed speed for the bar feed is selectable in two stages (300 and 600 mm per second). As soon as an operating cycle has been completed in the machine tool, the collet chuck opens in the machine tool spindle, and the bar is pushed further with the preselected speed up to the swinging stop of the machine tool. The feed force is continuously adjustable, so that the bar will not impact against the swinging stop with too much momemtum. For turning lathes, there can be adjusted a restoring force which prevents the bar, as a result of the spindle head longitudinal adjustments from being pulled out of the clamping jacket. The feed force and restoring force are applied via the regulatable drive clutch k1, with the motor running without interruption.

The monitoring of the feeding is performed by engaging the blocking clutch k2 for each workpiece feed. As a result, the feed control switch b40 is each time encountered and supervises the reaching of the feed length.

If the bar is used up to such an extent that the remnant which is present produces only one further workpiece, then the control cam sn1 activates the "backward movement m2 after last workpiece and camshaft stop" reversal switch b2. When the last workpiece is readied, the spindle of the machine tool is brought to a stop and the return movement of the magazine starts at lowest speed.

The still open "counter disk start position" control switch b30 keeps the counter clutch k3 engaged for so long until the counter disk 113 has returned to its null position. Then the counter disk 113 remains in its rest position, and the further return movement proceeds at highest speed.

This ends a cylce of operation.

In FIG. 1, the correspondence of parts to those in FIG. 6 is motor 1 (m2), clutch 1a (k1), feed chain 3(101), stop 4 (switch b4), clutch 6 (k2), blocking disk 7 (115), block 8 (116), return spring 10 (F), stop 11 (control switch b3), clutch 13 (k3), switch-activating cam 16 (like counter cam 14), control switch 18 (like "counter disk start position" control switch b30), control switch 19 (like b41).

In FIG. 3, the correspondence of parts to those in FIG. 6 is counter clutch 13' (k3), counter disk 21 (113), counter cam 22 (114), latch 23 (the illustrated latch in FIG. 6), control switch 25 (b30), switch 26 (b41).

The same elements appear in the others of FIGS. 1–5, and the correspondences are self-explanatory.

It will be understood that each of the elements described above, or two or more together, may also find a useful application in other types of constructions differing from the types described above.

While the invention has been illustrated and described as embodied in a control arrangement making use of distance measuring arrangements for controlling the travel of work in a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In a bar loading magazine for the automatic feeding of bars to a bar machine, the bar loading magazine being of the type comprised of bar-engaging means, a feed chain for driving the bar-engaging means, and a start switch arrangement for sensing the arrival of the leading end of a bar, the bar loading magazine including in combination therewith a feed control arrangement for establishing the feed distance required for properly positioning the leading end of the bar in the bar machine, the feed control arrangement including first and second distance-measuring means operative successively and independently of each other for controlling respective first and second components of the movement of the feed chain, the first component of the movement being a cyclical incremental movement, the second component of the movement occurring after a plurality of the cyclical incremental first components of the movement, said first distance-measuring means including fixed stop means operative for limiting the first component of the movement of the feed chain.

2. In a bar loading magazine as defined in claim 1, wherein said first distance-measuring means comprises means for measuring both forward and backwards feeding of a bar.

3. In a bar loading magazine for the automatic feeding of bars to a bar machine, the bar loading magazine being of the type comprised of bar-engaging means, a feed chain for driving the bar-engaging means, and a start switch arrangement for sensing the arrival of the leading end of a bar, the bar loading magazine furthermore including in combination therewith a feed control arrangement for establishing the feed distance required for properly positioning the leading end of the bar in the bar machine, the feed control arrangement including first and second distance-measuring means operative successively and independently of each other for controlling first and second components of the movement of the feed chain, the first component of the movement being a cyclical incremental movement, the second component of the movement occurring after a plurality of the cyclical incremental first components of the movement, said first distance-measuring means including fixed stop means operative for limiting the feeding of a bar, said feed control arrangement furthermore including means for activating said first distance-measuring means in synchronism with the activation of the feed chain and for causing said first distance-measuring means to measure a distance corresponding to the length of one workpiece.

4. In a bar loading magazine as defined in claim 1, wherein said second distance-measuring means is operative for controlling the feeding of a new bar over a relatively long distance and includes means operative upon the traversing of the relatively long distance for activating said first distance-measuring means for subsequently controlling the feeding of the bar over a relatively short distance.

5. In a bar loading magazine as defined in claim 4, wherein said means for activating said first distance-measuring means comprises counting means for counting the rotations of a rotating member moving in synchronism with said feed chain.

6. In a bar loading magazine as defined in claim 4, wherein said means for activating said first distance-measuring means comprises counting means for counting the pulses generated by a pulse generator which is driven by said feed chain.

7. In a bar loading magazine as defined in claim 4, the bar loading magazine including a drive motor having an output shaft, and transmission means coupling said feed chain to said output shaft, and wherein said means for activating said first distance-measuring means comprises a synchronizing member mounted on the output shaft of the drive motor and counting means for converting the cyclical movement of the synchronizing member into pulses, counting the pulses and when a predetermined count is reached activating said first distance-measuring means.

8. In a bar loading magazine as defined in claim 4, wherein said first distance-measuring means includes two first distance-measuring arrangements for controlling and limiting bar travel in opposite directions.

* * * * *